Feb. 1, 1966 W. B. JEFFREY 3,232,579
ANGLE COCK
Filed May 22, 1963

INVENTOR.
WILLIAM B. JEFFREY
BY *Joseph Januszkiewicz*
ATTORNEY

United States Patent Office 3,232,579
Patented Feb. 1, 1966

3,232,579
ANGLE COCK
William B. Jeffrey, Irwin, Pa., assignor to Westinghouse Air Brake Company, Wilmerding, Pa., a corporation of Pennsylvania
Filed May 22, 1963, Ser. No. 282,405
9 Claims. (Cl. 251—312)

This invention relates to an angle cock, and more particularly to a new and improved angle cock for use on railway cars.

The standard angle cock used in fluid pressure braking systems on railway cars and trains controls communication through the brake pipes. Such an angle cock comprises a casing having a tapered cock key rotatably mounted therein. The cock key has a through bore which communicates with a passageway in the casing. Because of the metal-to-metal contact between the cock key and the tapered bore in the casing in which it is located, precision machining and lapping is necessary to minimize leakage between the parts as well as to establish minimum friction between cooperating surfaces. Such requirements in tolerance add considerably to the cost of manufacture. In addition, such angle cocks were difficult to repair and required replacement of the entire angle cock.

It is an object of this invention to provide an improved angle cock which can be easily repaired or reconditioned with a minimum of skill and equipment. Such an angle cock, in addition to being economical to manufacture, permits the replacement of parts in the field without removing the angle cock from the railway car or disturbing the pipe connections thereto. The cock key is so constructed as to reduce the force necessary for operation between open and closed position as well as assuring a positive seal even at low pressures.

Accordingly, the improved angle cock comprises a casing having a chamber with a fluid passageway extending through such casing and communicating with such chamber. The wall portion of the casing within the chamber adjacent the connection of the passageway with the chamber defines a cylindrical valve seat with which a cylindrical cock key cooperates to control the passage of fluid through such chamber into such passageway past the valve seat. The cock key has a relaceable wrap-around gasket having projections thereon which releasably lock in recesses on the cock key body to permit quick and easy replacement thereof. The angle cock has a replaceable cap member which opens directly into the chamber to permit replacement as well as repair of the cock key without disturbing pipe connections to the angle cock body.

Other objects and advantages of the invention become more apparent in the following more detailed description of the invention.

Figure 1:
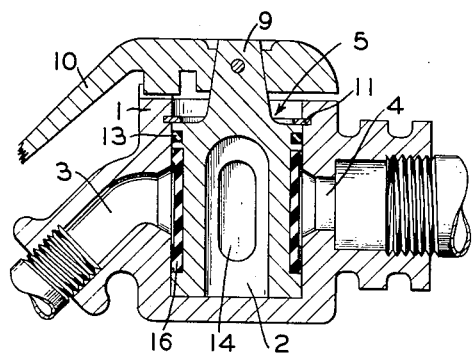
FIG. 1 is a longitudinal sectional view of the angle cock.
Figure 2:
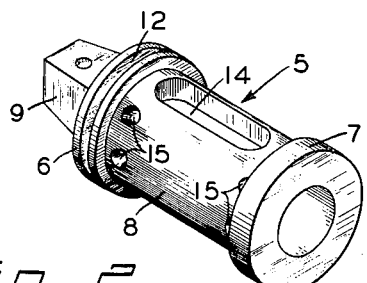
FIG. 2 is a perspective view of the cock key body with a gasket removed.

Referring to the drawings, and more particularly to FIG. 1, the angle cock comprises a casing 1 having a vertically disposed cylindrical bore 2, which bore 2 communicates with a pair of diametrically opposed passageways 3 and 4. Slidably received within the cylindrical bore 2 is a generally cylindrical cock key 5 (FIG. 2) having an upper flanged portion 6, a lower flanged portion 7, and an intermediate portion 8 of reduced diameter. The cock key 5 has an upwardly extending central shaft portion 9 to which an operating handle 10 is suitably connected to facilitate the rotation of cock key 5 relative to the stationary casing 1. The upper end portion of cylindrical bore 2 has a circumferentially extending recess or groove which receives a conventional snap ring 11 for retaining cock key 5 within the cylindrical bore 2. Removal of the snap ring 11 permits the removal of the cock key 5 from the casing 1. The upper flanged portion 6 of cock key 5 has a circumferentially extending recess 12 which receives an O-ring or grommet seal 13 to prevent leakage of fluid past the cock key 5 from cylindrical bore 2. The intermediate portion 8 of the cock key 5 has an elongated bore 14 extending therethrough for connecting passageways 3 and 4 in a certain position of rotation of cock key 5. As shown in FIG. 2, the intermediate portion 8 has a pair of laterally spaced retaining holes 15 closely adjacent the upper flanged portion 6 and a pair of laterally spaced retaining holes 15 closely adjacent the lower flanged portion 7, with such holes 15 also being longitudinally aligned in pairs for a purpose to be set forth.

A flat rectangular-shaped gasket 16 made of rubber or rubber composition (FIG. 3), having dowels 17 formed integrally on the respective corners thereof, has a pair of spaced elongated recesses 18, such that the pressing of one set of adjacent dowels 17 into a pair of longitudinally spaced retaining holes 15, with the wrapping of the flat gasket 16 around the intermediate body portion of key body 5, and the pressing of the other set of longitudinally aligned adjacent dowels 17 into the longitudinally spaced retaining holes 15 aligns the recesses 18 with the through bore 14 on the key body of cock key 5. Gasket 16 has a pair of spaced, rectangular-shaped beads or rib seals 19 raised from the surface of the gasket, such that rotation of cock key 5 in cylindrical bore 2 moves rib seals 19 into sealing engagement with the inner wall surface of cylindrical bore 2 adjacent the passageways 3 and 4, respectively, to thereby seal such passageways 3 and 4 from the passage of fluid therethrough.

In the operation of the angle cock, the cock key 5, in the position shown in FIG. 1, has the rib seals 19 abuttingly engaging the respective inner wall surface of the cylindrical bore 2 adjacent the passageways 3 and 4 as above described wherein fluid communication between passageways 3 and 4 is effectively blocked. Rotation of cock key 5 through approximately 90° by handle 10 rotates the cock key 5 such as to align passageways 3 and 4 through the recesses 18 of gasket 16 and through the elongated bore 14 in the cock key body of the cock key 5 for the unrestricted passage of fluid therethrough.

In repairing the angle cock after the handle is first removed, the snap ring 11 is removed and the cock key 5 is then removed from the cylindrical bore 2 by lifting upwardly on the shaft portion 9. Gasket 16 is removed and replaced with a new gasket 16 by pressing dowels 17 into retaining holes 15, wrapping gasket 16 around the intermediate portion 8 of cock key 5, and pressing the remaining longitudinally spaced dowels 17 into the longitudinally spaced retaining holes 15. Cock key 5 is then returned into the cylindrical bore 2. Snap ring 11 is positioned into the annular recess in the upper end portion of cylindrical bore 2 to secure the cock key 5 within the cylindrical bore 2.

Figure 4:
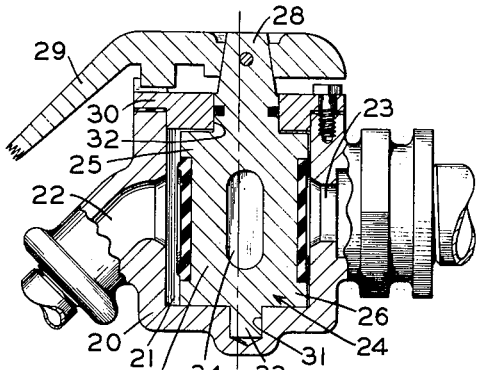
FIG. 4 is a longitudinal sectional view of an angle cock showing a modified form of cock key, in which the axis of rotation of the cock key is eccentric to the axis of the body bore.
Figure 3:
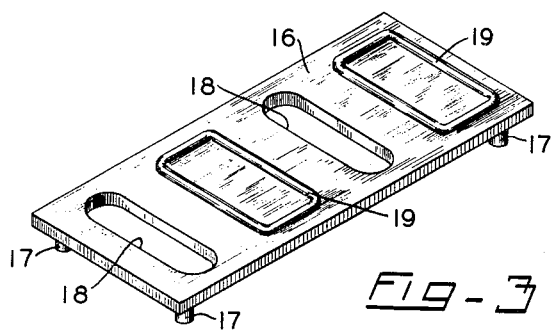
FIG. 3 is a perspective view of the gasket showing dowels and recesses thereon which cooperate with complementary parts on the cock key body.

A modification of the angle cock shown in FIGS. 1–3 is illustrated in FIG. 4, wherein the angle cock comprises a casing 20 having a vertically disposed cylindrical bore 21, which bore 21 communicates with a pair of diametrically opposed passageways 22 and 23. Slidably received within the cylindrical bore 21 is a generally cylindrical cock key 24 whose body portion has an upper flanged portion 25, a lower flanged portion 26, and an intermediate portion 27 of reduced diameter. The cock key 24 has an upwardly extending central shaft portion 28 to which an operating handle 29 is suitably connected to facilitate the rotation of the cock key 24 relative to the stationary casing 20. The upper end portion of cylindrical bore 21 has a cap 30 suitably secured to the casing 20 and cooperative therewith to define a closed chamber which communicates with the respective passageways 22 and 23. Casing 20 has a counterbore 31 in its bottom end portion which is open to the cylindrical bore 21 such that the longitudinal center line of counterbore 31 is offset from or eccentric to the longitudinal center line of the cylindrical bore 21. Cap 30 has a bore 32 whose longitudinal center line coincides with the longitudinal center line of the counterbore 31 and thereby similarly has its longitudinal center line offset from the longitudinal center line of cylindrical bore 21. The upwardly extending central shaft portion 28 of cock key 24 is journaled in bore 32 of cap 30 and a downwardly extending projection 33 on cock key 24 is journaled in the counterbore 31 to thereby provide an eccentrically mounted body. The intermediate portion 27 of cock key 24 has an elongated bore 34 extending therethrough for connecting passageways 22 and 23 in a certain position of rotation of cock key 24. The intermediate portion 27 of cock key 24 has a pair of retaining holes 15 similar to the retaining holes 15 of the prior disclosed embodiment which receive the dowels 17 of the rectangular-shaped gasket 16 such that the wrapping of the flat gasket 16 around the intermediate body portion 27 of cock key 24 and the pressing of the remaining set of longitudinally spaced dowels 17 into the remaining longitudinally spaced holes 15 aligns the recesses 18 on the gasket 16 with the through bore 34 on the key 24 in the same manner as the first embodiment. Gasket 16 in the second embodiment is similar in all respects to the gasket described in the previous embodiment which gasket similarly has rib seals 19 for engagement with the inner surface of the cylindrical bore 21 of casing 20.

In the operation of the angle cock, the cock key body 24, in the position shown in FIG. 4, has the rib seals 19 abuttingly engaging the inner wall surface of the cylindrical bore 21 adjacent the passageway 23 such as to block fluid communication between pasageways 22 and 23. Rotation of the cock key body 24 by handle 29 rotates the cock key 24 such as to align passageways 22 and 23 through the recesses 18 of gasket 16 and through the elongated bore 34 in cock key body 24 for the unrestricted passage of fluid therethrough. Such rotation is accomplished without restriction since the eccentrically mounted cock key 24 has no frictional contact with wall surface of the cylindrical bore 21 except for the sealing engagement of rib seals 19 with the wall of bore 21 to close passageway 23. In repairing the angle cock, the handle and cap 30 are first removed and then cock key 24 is then removed from the cylindrical bore 2 by lifting upwardly on the central shaft portion 28 such as to facilitate removal of the gasket 16. Gasket 16 is removed and replaced with a new gasket 16 by pressing dowels 17 into the retaining holes on the cock key body, wrapping the gasket 16 around the intermediate portion 27 of the cock key 24 and pressing the remaining longitudinally paced dowels 17 into the longitudinally spaced retaining holes on the cock key 24. The cock key 24 is returned into the cylindrical bore 21 and the cap 30 is then appropriately positioned on the upper end portion of the casing 20 and suitably secured to the casing 20.

Having now described the invention, what I claim as new and desire to secure by Letters Patent is:

1. An angle cock, comprising:
   (a) a casing having a bore therein and a pair of passage means intersecting said bore,
   (b) a valve member disposed in said bore for rotational movement about its axis and having a passage therethrough for registering its ends with said pair of passage means when said valve member is disposed in a first position about its axis,
   (c) a flexible gasket member having opposed end portions and removably disposed in flush engagement with said valve member with said end portions extending in opposite directions circumferentially of said valve member,
   (d) means for preventing movement of said gasket member with respect to said valve member,
   (e) said gasket member including a pair of spaced apertures each coincident with one of the ends of said pasage, and including at least one bead means thereon for sealingly surrounding one of said pair of passage means when the valve member is disposed in a second axial rotative position.

2. The angle cock as recited in claim 1, but further characterized in that:
   (a) said gasket member extends circumferentially around said valve member with said opposing end portions disposed in abutting relationship.

3. The angle cock as recited in claim 1, but further characterized in that said gasket member includes an additional means for sealing the other one of said pair of passage means when the valve member is disposed in said second position.

4. The angle cock as recited in claim 1 in which the axis of rotation of said valve member is eccentrically disposed with respect to the axis of said bore.

5. The angle cock as recited in claim 1, but further characterized in that said valve member is retained in said chamber by a snap ring disposed on said casing.

6. The angle cock as recited in claim 1, but further characterized in that said means for preventing circumferential movement of said gasket member relative to said valve member comprises:
   (a) recess means in said valve member, and
   (b) means on said gasket member extending into said recess means.

7. The angle cock of claim 6, but further characterized in that said means on said gasket extending into said recess means comprises dowel means.

8. An angle cock, comprising:
   (a) a casing having a bore therein and a pair of passage means intersecting said bore,
   (b) a valve member having an intermediate portion of reduced diameter disposed in said bore for rotational movement about its axis and having a passage therethrough for registering its ends with said pair of passage means when said valve member is disposed in a first position about its axis,
   (c) a flexible gasket member having opposed end portions and disposed on said portion of reduced diameter in flush engagement with said valve member with said end portions extending in opposite directions circumferentially of said valve member, the combined radius of said valve member and said gasket being less than the radius of said bore,
   (d) means for preventing movement of said gasket member with respect to said valve member, and
   (e) said gasket member including therein a pair of spaced apertures, each coincident with one of the ends of said passage, and having integral therewith a radially extending bead means engaging the surface of said bore for sealingly surrounding one of said passage means when said valve member is disposed in a second position about its axis.

9. The angle cock as recited in claim 8, but further characterized in that said means for preventing movement of said gasket member comprises recess means in said valve member and dowel means on said gasket member frictionally retained in said recess means.

(References on following page)

References Cited by the Examiner

UNITED STATES PATENTS

| | | | |
|---|---|---|---|
| 948,075 | 2/1910 | Richard | 251—309 |
| 2,105,331 | 1/1938 | Rasmussen | 251—182 |
| 2,599,274 | 6/1952 | Murnin | 251—309 |
| 2,634,946 | 4/1953 | Mueller | 251—309 X |
| 2,864,580 | 12/1958 | Lemoine | 251—317 |

FOREIGN PATENTS

| | | |
|---|---|---|
| 1,109,781 | 9/1955 | France. |
| 1,111,699 | 11/1955 | France. |
| 284,372 | 3/1913 | Germany. |
| 755,536 | 8/1956 | Great Britain. |
| 852,347 | 10/1960 | Great Britain. |

M. CARY NELSON, *Primary Examiner.*